United States Patent [19]
Occhialini et al.

[11] Patent Number: 5,582,029
[45] Date of Patent: Dec. 10, 1996

[54] USE OF NITROGEN FROM AN AIR SEPARATION PLANT IN CARBON DIOXIDE REMOVAL FROM A FEED GAS TO A FURTHER PROCESS

[75] Inventors: James M. Occhialini, Allentown, Pa.; Rodney J. Allam, Guildford; Mohammed A. Kalbassi, Walton-on-Thames, both of England

[73] Assignee: Air Products and Chemicals, Inc., Allentown, Pa.

[21] Appl. No.: 538,878

[22] Filed: Oct. 4, 1995

[51] Int. Cl.[6] .................................................. F25J 3/00
[52] U.S. Cl. ........................... 62/636; 60/39.12; 62/648; 62/928
[58] Field of Search ................................. 62/18, 24, 636, 62/648, 928; 60/39.12

[56] References Cited

U.S. PATENT DOCUMENTS

| | | | |
|---|---|---|---|
| 3,236,059 | 2/1966 | Bernstein | 62/13 |
| 4,250,704 | 2/1981 | Bruckner | 60/30.12 |
| 4,367,082 | 1/1983 | Tomisaka et al. | 62/18 |
| 4,372,764 | 2/1983 | Theobald | 62/41 |
| 4,806,136 | 2/1989 | Kiersz et al. | 62/18 |
| 5,080,703 | 1/1992 | Rathbone | 62/38 |
| 5,090,973 | 2/1992 | Jain | 55/26 |

OTHER PUBLICATIONS

The COREX©–DR Connection leaflet.

*Primary Examiner*—Ronald C. Capossela
*Attorney, Agent, or Firm*—Geoffrey L. Chase

[57] ABSTRACT

A cryogenic air separation unit (ASU) provides flows of oxygen and nitrogen. The oxygen is used in a process such as COREX iron making or the partial oxidation of hydrocarbons, or in an oxycoal fuelled blast furnace, producing an off-gas containing useful components ($H_2$ and CO) and carbon dioxide. The carbon dioxide is removed by pressure swing adsorption using nitrogen from the ASU as a regeneration gas and the purified off-gas becomes a feed gas to a further process such as production of iron by direct reduction of iron ore or the production of a $NH_3$ making ammonia or is recycled into the first process as a feed gas.

17 Claims, 1 Drawing Sheet

5,582,029

USE OF NITROGEN FROM AN AIR SEPARATION PLANT IN CARBON DIOXIDE REMOVAL FROM A FEED GAS TO A FURTHER PROCESS

TECHNICAL FIELD OF THE INVENTION

The present invention relates to the integration of air separation plant producing oxygen and nitrogen with a process producing an off-gas containing carbon dioxide and apparatus for removing said carbon dioxide from said off-gas so that the off-gas may be used in a further process.

DESCRIPTION OF THE PRIOR ART

It has been proposed to integrate the operation of an iron or steel making process, eg. a COREX iron making unit, with plant for the direct reduction of iron ore to iron powder e.g. of a MIDREX type. The off-gas from the COREX iron making plant contains large quantities of hydrogen and carbon monoxide, but also carbon dioxide and water vapour which needs to be removed before off-gas can be used in the MIDREX plant. The standard method of carbon dioxide removal for this off-gas stream is a conventional physical or chemical absorption process such as Selexol or MEA (methylethanolamine).

The iron or steel making process requires a supply of oxygen and this may be supplied by a cryogenic air separation unit producing oxygen and nitrogen, with the nitrogen essentially being waste.

Processes are known for the removal of carbon dioxide from gas streams by the adsorption of the carbon dioxide onto a solid adsorbent which periodically is regenerated. Regeneration may be by heating as in temperature swing adsorption (TSA), by reduction of pressure as in pressure swing adsorption (PSA). The pressure may be reduced to a level not below ambient as in conventional pressure swing adsorption, or to below atmospheric as in vacuum swing adsorption (VSA). In each case it is common to purge the desorbed carbon dioxide from the adsorbent by a flow of regeneration or purge gas. It is known that it is desirable that the regeneration gas should have as low a content of the gas being removed in the adsorbent as possible (see e.g. U.S. Pat. No. 5,090,973)

BRIEF DESCRIPTION OF THE INVENTION

According to the present invention there is now provided a method for the separation of air into oxygen and nitrogen and for the use of nitrogen so produced, which method comprises operating a cryogenic air separation unit to produce oxygen and nitrogen, operating a process which produces an off-gas containing carbon dioxide mixed with at least one other gas, and removing carbon dioxide from said off-gas by alternating adsorption of the carbon dioxide onto an adsorbent and the regeneration of the adsorbent under a flow of said nitrogen from the air separation unit.

The invention includes apparatus for the separation of air into oxygen and nitrogen and for the use of nitrogen so produced, which apparatus comprises:

a cryogenic air separation unit having an inlet for air to be separated and outlets for oxygen and nitrogen as separated components of said air, apparatus for conducting a process having an inlet for feed materials for said process and an outlet for off-gas produced in said process, a carbon dioxide removal unit containing a regenerable adsorbent and having an inlet for said off-gas as a feed gas to the carbon dioxide removal unit, an inlet for nitrogen as a purge gas for regeneration of the adsorbent in said carbon dioxide removal unit and an outlet for said off-gas containing a decreased concentration of carbon dioxide, and means for supplying nitrogen from said nitrogen outlet of the air separation unit to the inlet for nitrogen of the carbon dioxide removal unit.

Preferably, oxygen from the air separation unit is used in said process producing said off-gas and said apparatus therefore comprises means for supplying oxygen from said oxygen outlet of the air separation unit as a feed gas to said apparatus for carrying out a process.

Said process could be an iron or steel making process and said off-gas will then contain hydrogen and carbon monoxide as well as said carbon dioxide.

Preferably, said off-gas, from which carbon dioxide has been removed, is used in a further process, such as the production of iron by direct reduction of iron ore or is recycled for use in the first said process. Accordingly, the apparatus preferably includes apparatus for conducting a second process having an inlet for said off-gas containing a decreased con-centration of carbon dioxide as a feed gas.

Said apparatus for conducting said second process may be apparatus for the production of iron by the direct reduction of iron oxide.

Another example of the use of the invention would be in conjunction with the making of hydrogen by partial oxidation of hydrocarbons. The hydrocarbons are oxidised to hydrogen, carbon monoxide and some carbon dioxide using oxygen which may be supplied by an air separation plant producing a "waste" nitrogen stream. The carbon monoxide is reacted with water vapour in a shift converter to produce hydrogen and carbon dioxide. The carbon dioxide may then be removed from the hydrogen using the nitrogen for regenerating the adsorbent used as described above. The hydrogen may be used in many processes including the reduction of nitrogen to ammonia or in refining oil. The nitrogen for the ammonia reaction may also of course come from the air separation plant. In this instance, the feed pressure to the $CO_2$ removal plant may be much higher e.g. up to 80 bara.

Accordingly, said apparatus for conducting a second process may be apparatus for the manufacture of ammonia by hydrogenation of nitrogen or oil refining apparatus.

A third example is the use of oxycoal (a mixture of oxygen and coal) as a substitute for coke in a blast furnace. The top gas produced by the blast furnace will contain considerable fuel values as well as $CO_2$. By removing the carbon dioxide in accordance with the invention, one may recycle the top gas as fuel for the blast furnace. The oxygen for the process and the nitrogen for regenerating the $CO_2$ absorbent can be supplied by an air separation plant.

The connections for supplying gases between the various units making up the apparatus need not be direct but may involve the storage of the gas in intermediate holding means.

DETAILED DESCRIPTION OF THE INVENTION

Figure 1:
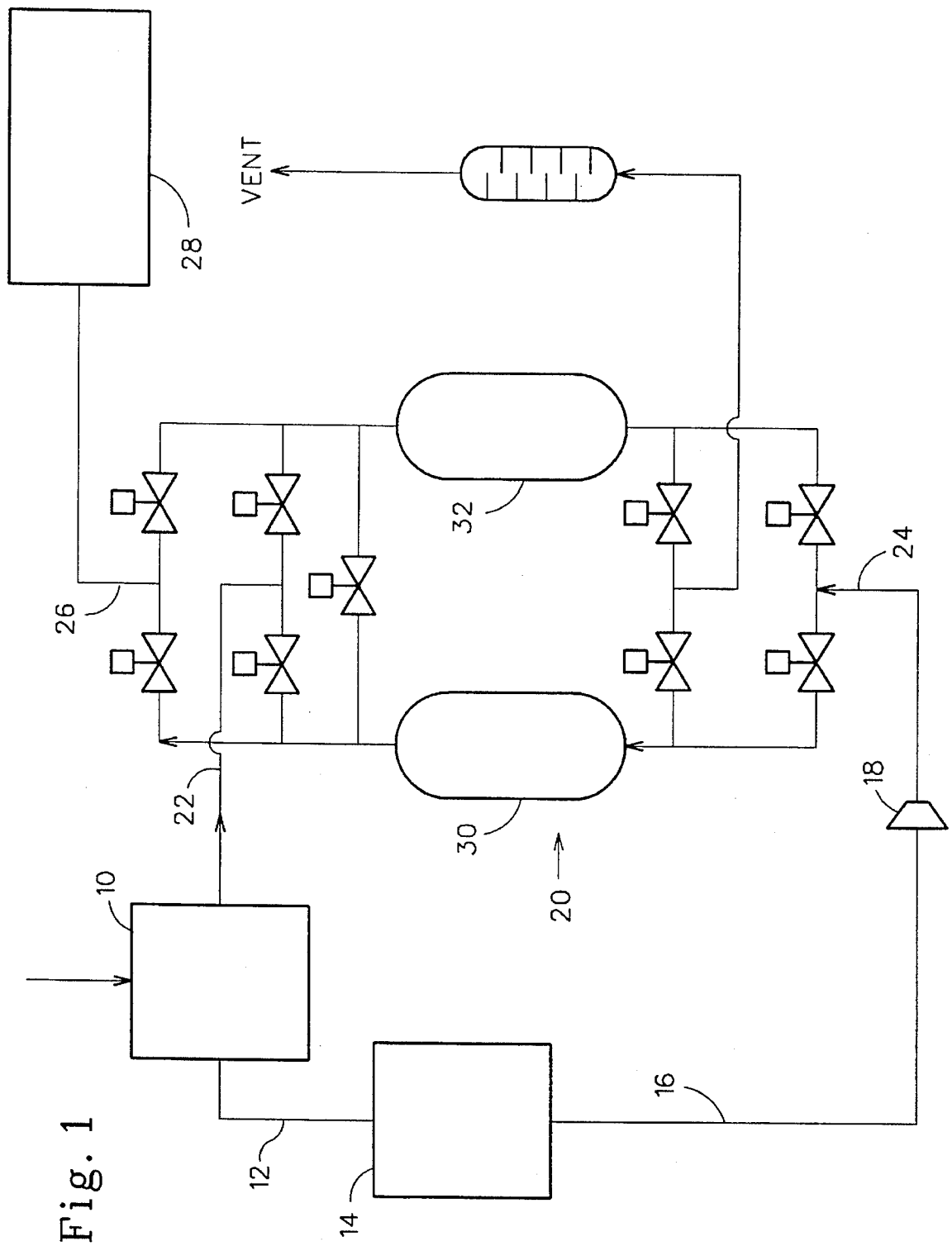
FIG. 1 is a schematic layout diagram of apparatus according to the invention.

As indicated above, whilst the invention is of very general applicability, it may be applied in the context of integrating an iron or steel making plant with a MIDREX type direct reduction of iron ore process. The invention will therefore be described in detail by way of illustration in that context.

In such a system, the invention involves the use of waste nitrogen from a cryogenic air separation plant to regenerate an adsorbent in an adsorption process in which bulk carbon dioxide is separated and removed from a gas stream. The adsorption process can be of the TSA type but will preferably operate as a pressure swing system (PSA) with regeneration taking place either at a vacuum (VSA) or at a pressure above or at atmospheric. The most favourable process is a PSA with regeneration taking place as close to atmospheric pressure as possible. The adsorption of carbon dioxide will take place at a pressure elevated with respect to that of the regenera-tion gas.

The adsorption system can employ two or more adsorbent beds operating on a cycle which includes the following steps: adsorption;

purging with nitrogen at pressure to displace feed gas;

depressurisation;

low pressure nitrogen purge;

low pressure product purge to displace nitrogen; and pressurisation with feed gas and/or product gas.

The low pressure steps can be executed at close to atmospheric pressure or under vacuum. The choice of cycle steps depends upon requirements of the overall efficiency of the PSA process (recovery penalties, power and capital costs), composition and process conditions of the feed gas, and restrictions of the PSA effluent gas on the downstream process. As an example of such a process, integration of a cryogenic air separation unit (ASU) with an iron and steel making process will be considered.

The off-gas from an iron and steel making process contain large quantities of CO and $H_2$ and $CO_2$. It is desirable to remove $CO_2$ from such a gas stream when the high partial pressure of $CO_2$ will have adverse effect on downstream processes utilising the off-gas. For example, the off-gas from a COREX iron making process can be used in the production of directly reduced iron powder from iron ore in a reducing plant of the MIDREX type. For the off-gas to be of maximum value as a reducing gas for converting iron oxide to powdered metallic iron, the $CO_2$ partial pressure should be as low as possible. Water will be removed also. Mainly this will occur by condensation when the off-gas is cooled prior to conducting $CO_2$ adsorption at around ambient temperatures. Table 1 shows the composition of a typical COREX off-gas and its ideal composition following $CO_2$ removal. The composition can vary depending upon the quality of the raw materials and the specific, operation process. In a steel plant, such a gas stream is normally generated from the gasifier of a COREX plant or more traditional blast furnace system. Note that the water vapour content is zero because water is completely removed by the adsorption process.

TABLE 1

| Component | Before $CO_2$ Removal | After $CO_2$ Removal |
| --- | --- | --- |
| CO Mol % | 43.0 | 58.2 |
| $H_2$ Mol % | 18.7 | 25.6 |
| $CO_2$ Mol % | 26.5 | 2 or less |
| AN/$N_2$ Mol % | 8.6 | 11.7 |
| $CH_4$ Mol % | 1.75 | 2.5 |
| $H_2O$ Mol % | 1.45 | 0 |

The separation normally operates under the following process boundary conditions:

TABLE 2

|  | Unit | Range |
| --- | --- | --- |
| Operating Pressure | bara | 3 to 22 |
| Feed Temperature | C.° | 10 to 50 |
| Regeneration Gas Pressure | bara | 0.1 to 3 |

Standard adsorbents are used to perform the separation such as activated carbons, zeolites or activated aluminas. Other novel adsorbents that provide good carbon dioxide working capacity for adsorption in the proposed cycles include chemically treated aluminas, which have enhanced $CO_2$ capacity, and mixed silica/alumina adsorbents. A preferred treated alumina is obtained by adsorbing a solution of potassium carbonate on to alumina and drying at a temperature of up to 125° C. to achieve a loading of 5% by weight $K_2CO_3$. These adsorbents are favourable since there is a large quantity of nitrogen available from the ASU to regenerate them. For many types of processes which require $O_2$, an air separation plant is an integral part of the system and waste $N_2$ is a by-product. In the COREX example given, oxygen is required for injection into the iron melting vessel.

The invention will be further illustrated by the description of a preferred embodiment with reference to the accompanying drawing in which:

FIG. 1 illustrates the concept described above for removal of $CO_2$ from the off-gas of a COREX iron making process.

As shown in FIG. 1, air is separated into oxygen and nitrogen in cryogenic air separation unit (ASU) 10 and oxygen is conducted into a pipe line 12 to COREX iron making plant 14 from which off-gas is conducted via a line 16 to a compressor 18. Off-gas compressed by compressor 18 is introduced via an inlet 24 into a $CO_2$ removal plant 20 operating by PSA. For regeneration, the PSA plant 20 has an inlet 22 for nitrogen from the ASU. Purified off-gas depleted in $CO_2$ is fed from an outlet 26 of the PSA plant to a direct reduction iron making plant 28.

In an alternative embodiment, the COREX plant 14 may be replaced by a plant for oxidising hydrocarbons to hydrogen and CO2 and the iron making plant 28 may be replaced by a plant for making ammonia.

The PSA plant 20 may be of conventional design having first and second vessels 30, 32 arranged in parallel with control valves enabling cycles of on-line flow, depressurisation, purging, nitrogen flow for regeneration, product purge, repressurisation and return to on-line duty to be conducted for both vessels in a manner which maintains one vessel on-line at all times.

The feed gas is available at a pressure of about 2 bar from the COREX plant 14 or it may be available at close to atmospheric pressure from a gas holder. The gas is filtered to remove dust and compressed to 4 bar pressure in the compressor 18. It is cooled to typically 30° C., condensed water is separated and the gas is passed through vessel 30 containing one bed of a two bed adsorption system. The adsorbent is, for example, an activated alumina, a silica alumina, e.g. Alcoa H156 or a $K_2CO_3$ modified alumina. The adsorbent may also be a mixed bed of activated alumina and molecular sieve, e.g. a first layer of activated alumina principally to remove water and a second layer of 13× mol. sieve. The adsorbent removes water and carbon dioxide. Other components (in trace amounts) not listed in the COREX component table (Table 1) may also be present. One example is hydrogen sulfide. With an alumina adsorbent, the hydrogen sulfide will adsorb with the $CO_2$ and come off in the tail gas during regeneration/purging. In this case, the tail gas may be further processed by standard methods to remove and dispose of the hydrogen sulfide. Alternatively, the feed gas may be prepurified by standard methods to remove the hydrogen sulfide and other contaminants prior to the adsorption process.

The feed flow to the PSA vessel 30 is continued until the outlet $CO_2$ concentration reaches 2% for example. The down-stream processing operation will set the allowable $CO_2$ in the effluent stream. The specification can vary from ppm levels to 5–10%. Optionally, the bed can be purged co-currently with 4 bar nitrogen to displace the feed gas from the free space of the vessel. The vessel 30 is then depressurised counter-currently and purged counter-currently with dry, $CO_2$ free nitrogen at pressure close to atmospheric taken from the ASU 10 which produces oxygen gas for the COREX process. The nitrogen gas desorbs $CO_2$ and water from the adsorbent. A counter-current product purge or a co-current feed purge can be used to displace the nitrogen from the free space of the vessel. This may or may not be necessary depending upon the nitrogen purity specification of the product gas. If this step is necessary, the recovery of the CO and $H_2$ from the system will be reduced. After regeneration and purging is completed, the vessel is pressurised with either feed, or product. Then the feed flow is passed through the bed and the cycle recommences. A typical adsorption period is 5 to 15 minutes with a total cycle time of 10 to 30 minutes (for a two bed system). A two bed cycle sequence with a standard cycle time is shown in Table 3.

TABLE 3

| Adsorption 360 Sec | | | | Dp 40 Sec | Nitrogen Purge 160 Sec | Product Purge 40 Sec | Product Rp 120 Sec |
|---|---|---|---|---|---|---|---|
| Dp 40 Sec | Nitrogen Purge 160 Sec | Product Purge 40 Sec | Product Rp 120 Sec | Adsorption 360 Sec | | | |

The use of available, waste nitrogen from the ASU provides greater flexibility in cycle design for the PSA. The nitrogen from the ASU is waste but has significant value in regenerating the adsorbent. Typically, the PSA operation is thought of as a self-contained unit and, thus productivity of the PSA has a theoretical limit. The introduction of an external gas source extends its limit of applicability. With this "free" source of regeneration gas, the PSA system can be operated at high recoveries with only moderate pressure swings to minimise power costs. In addition, the capital costs are minimised since the feedstock does not require compression to high pressure and large vacuum trains are not generally required.

Although the invention has been described with reference to the preferred embodiment illustrated in the drawing, it should be appreciated that many modifications and variations are possible within the scope of the invention.

We claim:

1. A method for the separation of air into oxygen and nitrogen and for the use of nitrogen so produced, which method comprises operating a cryogenic air separation unit to produce oxygen and nitrogen, operating a process which produces an off-gas containing carbon dioxide mixed with at least one other gas, and removing carbon dioxide from said off-gas by alternating adsorption of the carbon dioxide onto an adsorbent and the regeneration of the adsorbent under a flow of said nitrogen from the air separation unit.

2. A method as claimed in claim 1, wherein oxygen from the air separation unit is used in said process producing said off-gas.

3. A method as claimed in claim 2, wherein said process is an iron or steel making process and said off-gas contains hydrogen and carbon monoxide as well as said carbon dioxide.

4. A method as claimed in claim 2, wherein said process is the production of hydrogen by partial oxidation of hydrocarbons by said oxygen to produce an off-gas containing said hydrogen together with carbon dioxide.

5. A method as claimed in claim 1, further comprising using said off-gas, from which carbon dioxide has been removed, in a further process or by recycle to same process.

6. A method as claimed in claim 5, wherein said further process is the production of iron by direct reduction of iron ore.

7. A method as claimed in claim 5, wherein said further process is the making of ammonia by reduction of nitrogen by hydrogen in said off-gas.

8. A method as claimed in claim 5, wherein said further process is the refining of oil by reaction with hydrogen in said off-gas.

9. A method as claimed in claim 5, wherein said process producing said off-gas is the operation of a blast furnace fuelled in part by oxycoal and the off-gas is recycled as fuel to said blast furnace after removal of carbon dioxide.

10. A method as claimed in claim 1, wherein the adsorbent is regenerated under a flow of nitrogen at a pressure of from 0.1 to 3 bara.

11. A method as claimed in claim 1 wherein the adsorbent is regenerated cocurrently with nitrogen to displace said off-gas from said adsorbent.

12. Apparatus for the separation of air into oxygen and nitrogen and for the use of nitrogen so produced, which apparatus comprises:

a cryogenic air separation unit having an inlet for air to be separated and outlets for oxygen and nitrogen as separated components of said air, apparatus for conducting a process having an inlet for feed materials for said process and an outlet for carbon dioxide containing off-gas produced in said process, a carbon dioxide removal unit containing a regenerable adsorbent and having an inlet for said off-gas as a feed gas to the carbon dioxide removal unit, an inlet for nitrogen as a purge gas for regeneration of the adsorbent in said carbon dioxide removal unit and an outlet for said off-gas containing a decreased concentration of carbon dioxide, and means for supplying nitrogen from said nitrogen outlet of the air separation unit to the inlet for nitrogen of the carbon dioxide removal unit.

13. Apparatus as claimed in claim 12, further comprising apparatus for conducting a second process having an inlet for said off-gas containing a decreased concentration of carbon dioxide as a feed gas.

14. Apparatus as claimed in claim 12, comprising means for supplying oxygen from said oxygen outlet of the air separation unit as a feed gas to said apparatus for carrying out a process.

15. Apparatus as claimed in claim 12, wherein said apparatus for conducting a process is for the production of iron and the off-gas produced contains hydrogen and carbon monoxide contaminated with carbon dioxide.

16. Apparatus as claimed in claim 12, wherein said apparatus for conducting a process is apparatus for the production of hydrogen by partial oxidation of hydrocarbons.

17. Apparatus as claimed in claim 12, wherein said apparatus for conducting a process is an oxycoal fuelled blast furnace having an inlet for said off-gas containing a decreased concentration of carbon dioxide as a fuel material for use in said blast furnace.

\* \* \* \* \*